US007178883B2

(12) United States Patent
Sekine

(10) Patent No.: US 7,178,883 B2
(45) Date of Patent: Feb. 20, 2007

(54) VEHICULAR BRAKE SYSTEM

(75) Inventor: Hiroshi Sekine, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/034,283

(22) Filed: Jan. 12, 2005

(65) Prior Publication Data
US 2005/0116538 A1 Jun. 2, 2005

Related U.S. Application Data

(63) Continuation of application No. 10/692,149, filed on Oct. 20, 2003, now abandoned.

(30) Foreign Application Priority Data
Oct. 25, 2002 (JP) .............................. 2002-311254

(51) Int. Cl.
B60T 8/32 (2006.01)

(52) U.S. Cl. ...................... 303/140; 303/146

(58) Field of Classification Search ................ 180/142, 180/169, 197; 303/140, 146, 147, 148, 155; 701/70, 71, 72, 73
See application file for complete search history.

(56) References Cited

U.S. PATENT DOCUMENTS

| 5,596,252 | A | 1/1997 | Shimizu et al. |
| 6,017,101 | A | 1/2000 | Matsuda |
| 6,292,753 | B1 | 9/2001 | Sugimoto et al. |
| 6,434,933 | B1 * | 8/2002 | Oishi et al. ................. 60/547.1 |
| 6,474,750 | B2 * | 11/2002 | Tanaka et al. ........... 303/113.4 |
| 6,568,768 | B1 * | 5/2003 | Oka et al. ................ 303/113.3 |
| 6,666,530 | B2 * | 12/2003 | Mizutani et al. ......... 303/114.3 |
| 2002/0005662 | A1 | 1/2002 | Yasui et al. |

FOREIGN PATENT DOCUMENTS

| JP | 9-142272 | 6/1997 |
| JP | 2001-287632 | 10/2001 |

* cited by examiner

Primary Examiner—Christopher P. Schwartz
(74) Attorney, Agent, or Firm—Hamre, Schumann, Mueller & Larson, P.C.

(57) ABSTRACT

A vehicular brake system includes a brake actuator that enables brake assist to be carried out, the brake assist increasing a braking force exhibited by wheel brakes in response to a braking operation input by a vehicle driver in comparison with the braking force when it is unassisted. The system further includes braking operation detection means for detecting a braking operation by the driver; emergency avoidance steering operation detection means for detecting an emergency avoidance steering operation by the driver, and actuator control means for controlling operation of the brake actuator so as to carry out the brake assist in response to the detection means detecting a braking operation while an emergency avoidance steering operation is being detected by the detection means or during a period from the detection of the emergency avoidance steering operation by the detection means to the time when a predetermined period of time has elapsed after the detection has ended.

2 Claims, 8 Drawing Sheets

AMOUNT OF STEERING OPERATION

STEERING OPERATION SPEED

VEHICULAR BRAKE SYSTEM

This application is a Continuation of application Ser. No. 10/692,149, filed Oct. 20, 2003, now abandoned, which application(s) are incorporated herein by reference.

BACKGROUND OF THE INVENTION

1. Field of the Invention

The present invention relates to a vehicular brake system that includes a brake actuator that enables brake assist to be carried out, the brake assist increasing a braking force exhibited by a wheel brake in response to a braking operation input by a vehicle driver in comparison with the braking force when it is unassisted.

2. Description of the Related Art

There are conventional vehicular brake systems in which when a vehicle driver carries out an emergency avoidance steering operation to avoid an obstacle, etc. the steering operation is aided by automatically braking a wheel on the inner side of the turn (see, for example, Japanese Patent Application Laid-open No. 9-142272). Also, there are conventional vehicular brake systems in which the braking force exhibited by a wheel brake is increased in response to a sudden braking operation by a vehicle driver (see, for example, Japanese Patent Application Laid-open No. 2001-287632).

An emergency avoidance steering operation is carried out by a vehicle driver in order to avoid an obstacle in front or to drive around a sharp bend, etc. Although the technique described in Japanese Patent Application Laid-open No. 9-142272 effectively achieves avoidance of an obstacle and driving around a sharp bend, the technique cannot cope with a secondary obstacle unexpectedly appearing in front. In this regard, it is expected that braking can be aided by the brake assist disclosed in Japanese Patent Application Laid-open No. 2001-287632 in order to avoid a collision with the secondary obstacle or moderate the impact during the collision. While the vehicle driver is carrying out the emergency avoidance steering operation, the driver is concentrating on the steering operation, so that it is difficult to carry out a braking operation. In the arrangement disclosed in Japanese Patent Application Laid-open No. 2001-287632, the brake assist is carried out in response to a sudden braking operation by the vehicle driver. Since it is difficult to carry out a sudden braking operation during the emergency avoidance steering operation or immediately after the emergency avoidance steering operation, even if the technique described in this patent application is applied as it is, it cannot be expected that the collision with the secondary obstacle will be avoided or the impact during the collision will be moderated.

SUMMARY OF THE INVENTION

The present invention has been achieved in view of the above-mentioned circumstances, and it is an object of the present invention to provide a vehicular brake system that can avoid a collision with a secondary obstacle which appears after avoidance of a collision with a primary obstacle by an emergency avoidance steering operation, or can reduce the energy of the collision with the secondary obstacle.

In order to accomplish the above object, a first aspect of the present invention provides a vehicular brake system that includes a brake actuator that enables brake assist to be carried out, the brake assist increasing a braking force exhibited by wheel brakes in response to a braking operation input by a vehicle driver in comparison with the braking force when it is unassisted. The vehicular brake system further includes braking operation detection means for detecting a braking operation by the vehicle driver; emergency avoidance steering operation detection means for detecting an emergency avoidance steering operation by the vehicle driver; and actuator control means for controlling operation of the brake actuator so as to carry out the brake assist in response to the braking operation detection means detecting a braking operation while the emergency avoidance steering operation is being detected by the emergency avoidance steering operation detection means or during a period from the detection of the emergency avoidance steering operation by the emergency avoidance steering operation detection means to the time when a predetermined period of time has elapsed after the detection has ended.

In accordance with this arrangement, when the vehicle driver carries out the braking operation to avoid the secondary collision while carrying out the emergency avoidance steering operation or immediately after the vehicle driver has carried out the emergency avoidance steering operation, brake assist by the brake actuator is carried out even if the braking operation is not a sudden braking operation. Therefore, even when it is difficult for the vehicle driver to carry out the sudden braking operation as he has to concentrate on the emergency avoidance steering operation, brake assist can be carried out in response to the braking operation, thereby avoiding a collision with a secondary obstacle or moderating the energy of a collision with the secondary obstacle.

Furthermore, in order to accomplish the above object, a second aspect of the present invention provides a vehicular brake system that includes sudden braking operation detection means for detecting a sudden braking operation by a vehicle driver based on comparison between a reference value and a parameter in relation to the amount of braking operation by the vehicle driver; and a brake actuator that enables brake assist to be carried out when there is a sudden braking operation, the brake assist increasing a braking force exhibited by wheel brakes in response to a braking operation input by the vehicle driver in comparison with the braking force when no sudden braking operation is detected. The vehicular brake system further includes emergency avoidance steering operation detection means for detecting an emergency avoidance steering operation by the vehicle driver; and reference value changing means for changing the reference value to a side where the braking operation is easily detected as a sudden braking operation while the emergency avoidance steering operation is being detected by the emergency avoidance steering operation detection means or during a period from the detection of the emergency avoidance steering operation by the emergency avoidance steering operation detection means to the time when a predetermined period of time has elapsed after the detection has ended.

In accordance with this arrangement, when the vehicle driver carries out the braking operation to avoid the secondary collision while carrying out the emergency avoidance steering operation or immediately after the vehicle driver has carried out the emergency avoidance steering operation, brake assist by the brake actuator can readily be carried out by making it easy to judge the braking operation to be a sudden braking operation even if it is not a sudden braking operation. Therefore, even when it is difficult for the vehicle driver to carry out the sudden braking operation as he has to concentrate on the emergency avoidance steering operation, brake assist can be carried out in response to the braking operation, thereby avoiding a collision with a secondary obstacle or moderating the energy of a collision with the secondary obstacle.

Moreover, in accordance with a third aspect of the present invention, in addition to the first or second aspect, there is proposed a vehicular brake system wherein the system further includes turning movement target value determination means for determining a target value for vehicle turning movement; turning movement actual value detection means for detecting an actual value of vehicle turning movement; and turning movement control means for comparing the actual value with the target value and controlling the braking forces of the wheel brakes based on the result of the comparison so that the actual value approaches the target value; and when control by the turning movement control means is being carried out prior to a braking operation by the vehicle driver, the brake assist by the brake actuator is disabled, or the changing of the reference value by the reference value changing means is disabled.

In accordance with this arrangement, brake assist is not carried out when control by the turning movement control means is being carried out prior to a braking operation, so that the vehicle behavior is prevented from becoming unstable and the turning movement control and the brake assist control are prevented from interfering with each other; whereas, in the conventional system, when control by the turning movement control means is being carried out prior to a braking operation, the steering operation by the vehicle driver is being aided by the turning movement control means, and in this condition if the brake assist by the brake actuator is carried out, the vehicle behavior disadvantageously becomes unstable or the turning movement control and the brake assist control disadvantageously interfere with each other.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 is a fluid pressure system diagram showing the arrangement of a vehicular brake system;

FIG. 2 is a block diagram showing the arrangement of a brake control ECU;

FIG. 3 is a graph showing the dependence of avoidance steering load level on the amount of steering operation;

FIG. 4 is a graph showing the dependence of the avoidance steering load level on the speed of the steering operation;

FIG. 5 is a graph showing reference values for determining sudden braking operation conditions;

FIG. 6 is a graph showing the dependence of brake gain on the avoidance steering load;

FIG. 7 is a flow chart showing a brake assist control procedure; and

FIG. 8 is a flow chart of a sub-routine.

DESCRIPTION OF THE PREFERRED EMBODIMENT

Figure 1:
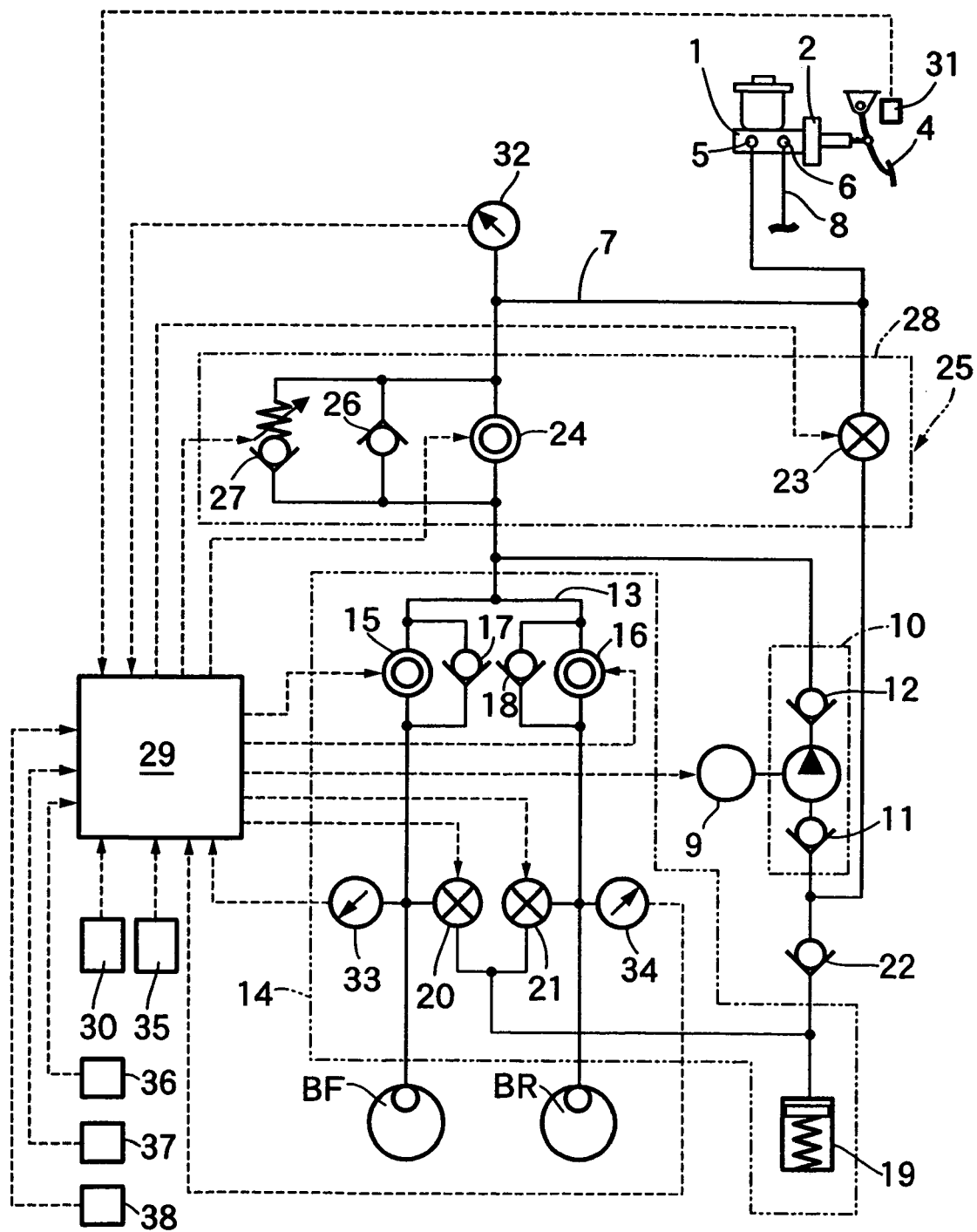
FIGS. 1 to 8 illustrate a first embodiment of the present invention.

Referring to FIG. 1, a master cylinder 1 mounted on, for example, a four-wheel vehicle receives an input of a brake operating force from a brake pedal 4 via a vacuum booster 2. This master cylinder 1 has a tandem type structure and includes a first output port 5 and a second output port 6, the first output port 5 corresponding to, for example, a front left wheel brake BF and a rear right wheel brake BR, and the second output port 6 corresponding to, for example, a front right wheel brake (not illustrated) and a rear left wheel brake (not illustrated). Output fluid pressure lines 7 and 8 are connected to the first and second output ports 5 and 6 respectively.

A brake system on the first output port 5 side and a brake system on the second output port 6 side have the same arrangement. Therefore, only portions related to the brake system on the first output port 5 side are explained below, and explanation of portions related to the brake system on the second output port 6 side is omitted.

The output fluid pressure of the master cylinder 1 can be increased by a pump 10 having an intake valve 11 and a discharge valve 12, the pump 10 being driven by a motor 9. The discharge side of the pump 10, that is, the discharge valve 12, is connected to a fluid pressure line 13.

Provided between the fluid pressure line 13 and the two wheel brakes BF and BR is pressure-adjusting means 14 which includes a normally open solenoid valve 15 provided between the front left wheel brake BF and the fluid pressure line 13, a normally open solenoid valve 16 provided between the rear right wheel brake BR and the fluid pressure line 13, a pair of one-way valves 17 and 18 connected in parallel to the normally open solenoid valves 15 and 16 respectively so as to allow brake fluid to flow from the wheel brakes BF and BR sides to the fluid pressure line 13 side, a single reservoir 19 shared between the two wheel brakes BF and BR, and normally closed solenoid valves 20 and 21 provided between the wheel brakes BF and BR respectively and the reservoir 19. The reservoir 19 is connected via a check valve 22 to the intake side of the pump 10, that is, the intake valve 11.

The above-described pressure-adjusting means 14 is capable of switching over between a state in which the fluid pressure of the fluid pressure line 13 acts on each of the wheel brakes BF and BR by opening the normally open solenoid valves 15 and 16 and closing the normally closed solenoid valves 20 and 21, a state in which the brake fluid pressure of each of the wheel brakes BF and BR is maintained by closing the normally open solenoid valves 15 and 16 and closing the normally closed solenoid valves 20 and 21, and a state in which the brake fluid pressure of each of the wheel brakes BF and BR is released to the reservoir 19 by closing the normally open solenoid valves 15 and 16 and opening the normally closed solenoid valves 20 and 21. Controlling the opening and closing of the normally open solenoid valves 15 and 16 as well as the normally closed solenoid valves 20 and 21 can control the fluid pressure of the fluid pressure line 13 to cause it to act on the wheel brakes BF and BR.

The output fluid pressure line 7 is connected via a normally closed solenoid valve 23 to a section between the check valve 22 and the intake side of the pump 10, that is, the intake valve 11, and via a normally open solenoid valve 24 to the fluid pressure line 13.

Connected in parallel to the normally open solenoid valve 24 is a one-way valve 26 that allows the brake fluid to flow from the output fluid pressure line 7 to the fluid pressure line 13 side. Also connected in parallel to the normally open solenoid valve 24 is a relief valve 27 which opens when the fluid pressure of the fluid pressure line 13 is higher than a relief pressure so as to release the fluid pressure from the fluid pressure line 13 to the output fluid pressure line 7 side. The relief pressure of the relief valve 27 is adjustable.

The normally closed solenoid valve 23, the normally open solenoid valve 24, the one-way valve 26, and the relief valve 27 work together to form brake assist means 28. This brake assist means 28 can change the brake output gain {(brake fluid pressure of the fluid pressure line 13/operating force on the brake pedal 4) or (vehicle deceleration speed/operating force on the brake pedal 4)}, which is the ratio of the brake output relative to the braking operation input by a vehicle driver, by adjusting the relief pressure of the relief valve 27 in a state in which the normally closed solenoid valve 23 is open and the normally open solenoid valve 24 is closed, thereby adjusting the braking pressures acting on the wheel brakes BF and BR, that is, the braking forces exhibited by the wheel brakes.

The pump 10, the pressure-adjusting means 14, and the brake assist means 28 form a brake actuator 25 that enables brake assist and adjusts the braking force of each of the wheel brakes BF and BR. The brake actuator 25 is controlled by a brake control ECU 29.

That is, the brake control ECU 29 controls the ON/OFF operation of the motor 9 for driving the pump 10, the open/close operation of each of the normally open solenoid valves 15 and 16 and the normally closed solenoid valves 20 and 21 of the pressure-adjusting means 14, the open/close operation of each of the normally closed solenoid valve 23 and the normally open solenoid valve 24 of the brake assist means 28, and the relief pressure of the relief valve 27.

Input into this brake control ECU 29 are detection signals from vehicle speed detection means 30 for detecting vehicle speed, braking operation amount detection means 31 for detecting the amount of depression of the brake pedal 4 by the vehicle driver and also functioning as braking operation detection means, brake master pressure detection means 32 for detecting the fluid pressure of the output fluid pressure line 7 which is the output pressure of the master cylinder 1, wheel brake pressure detection means 33 and 34 for detecting the brake pressures of the wheel brakes BF and BR, yaw rate detection means 35 for detecting the yaw rate of the vehicle, lateral acceleration detection means 36 for detecting the lateral acceleration of the vehicle, steering operation amount detection means 37 for detecting the amount of a steering operation by the vehicle driver, and steering operation speed detection means 38 for detecting the speed of the steering operation by the vehicle driver.

Figure 2:
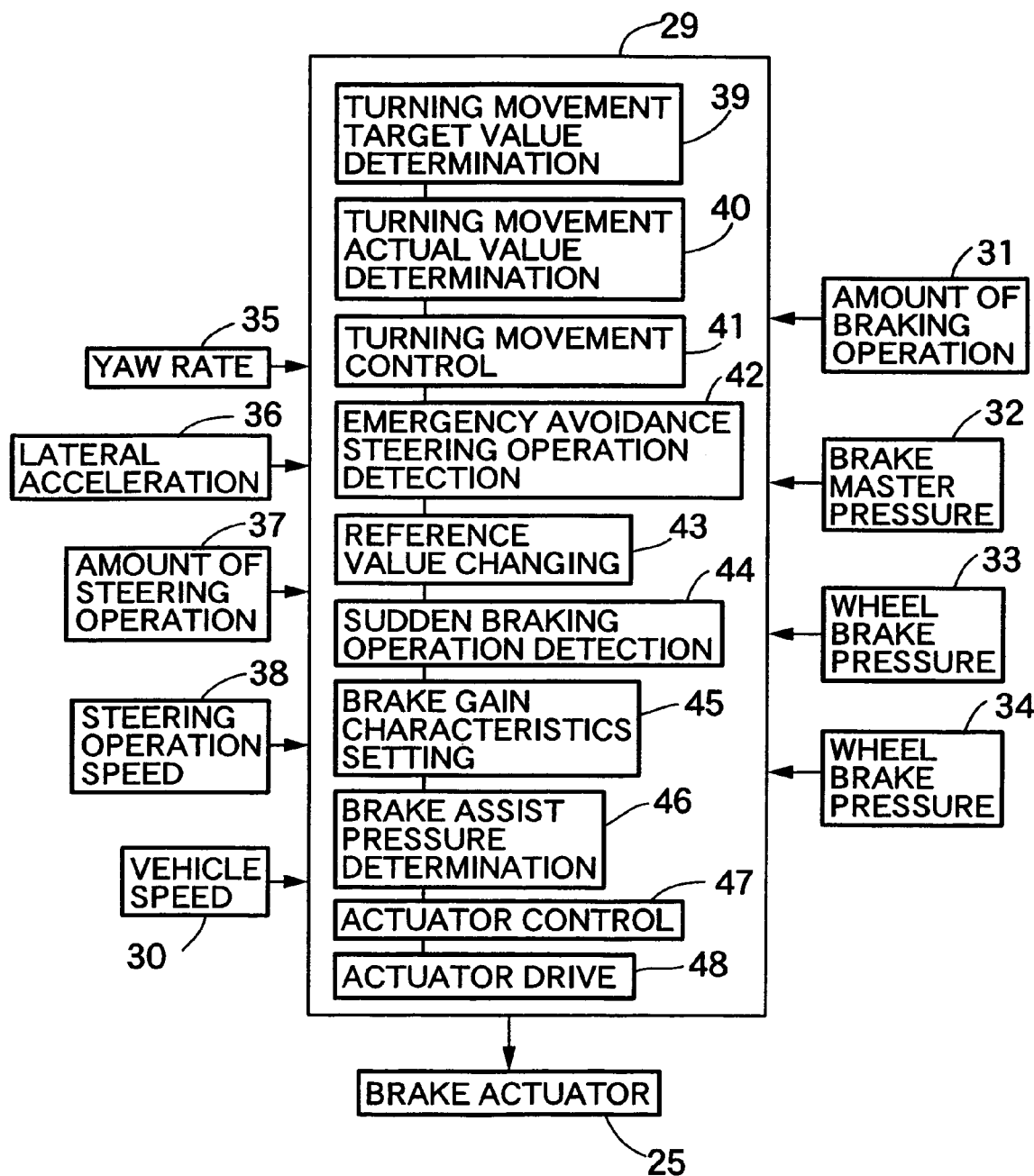

Referring also to FIG. 2, the brake control ECU 29 includes turning movement target value determination means 39 for determining a target value for the vehicle turning movement, turning movement actual value detection means 40 for detecting an actual value of the vehicle turning movement, turning movement control means 41 for comparing the actual value with the target value to control the braking forces of the wheel brakes BF and BR based on the result of the comparison so that the actual value approaches the target value, emergency avoidance steering operation detection means 42 for detecting an emergency avoidance steering operation by the vehicle driver, reference value changing means 43 for changing a reference value that is used as a criterion for a sudden braking operation, sudden braking operation detection means 44 for detecting a sudden braking operation by the vehicle driver, brake gain characteristics setting means 45 for setting the brake gain characteristics, brake assist pressure determination means 46 for determining the brake assist pressure for the brake assist means 28, actuator control means 47 for controlling the operation of the brake actuator 25, which includes the brake assist, and actuator drive means 48 for outputting a signal to operate the brake actuator 25 according to the control mode determined by the actuator control means 47.

The turning movement target value determination means 39 determines the target value for the turning movement based on the vehicle speed obtained by the vehicle speed detection means 30 and the amount of steering operation detected by the steering operation amount detection means 37. The turning movement actual value detection means 40 detects, as the actual value of the vehicle turning movement, the yaw rate obtained by the yaw rate detection means 35 or the lateral acceleration obtained by the lateral acceleration detection means 36.

Figure 3:
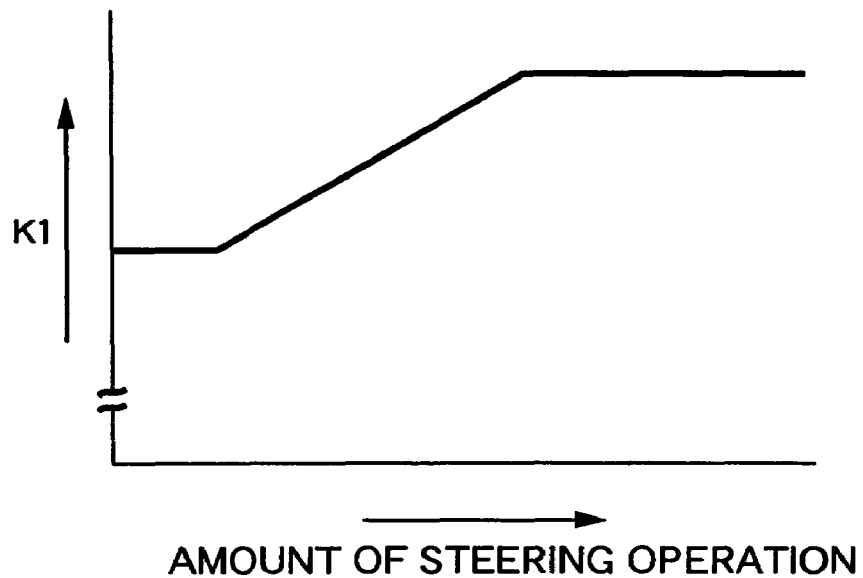
Figure 4:
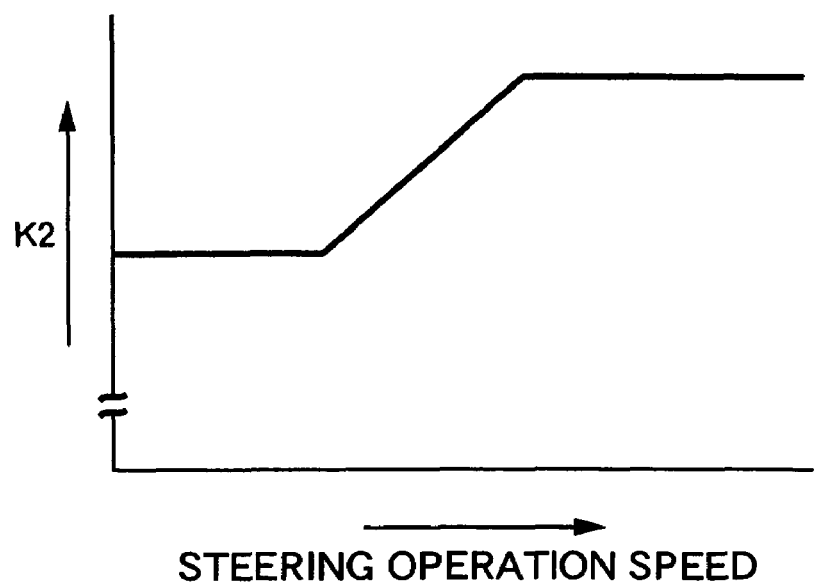

The emergency avoidance steering operation detection means 42 detects an emergency avoidance steering operation by the vehicle driver based on the amount of steering operation detected by the steering operation amount detection means 37 and the steering operation speed detected by the steering operation speed detection means 38. That is, an avoidance steering load level K1, which depends on the amount of steering operation, is set as shown in FIG. 3, and an avoidance steering load level K2, which depends on the steering operation speed, is set as shown in FIG. 4. When the avoidance steering load (K1×K2) which is the product of the load levels K1 and K2, exceeds a threshold value, the emergency avoidance steering operation detection means 42 determines that a steering operation by the vehicle driver is an emergency avoidance steering operation.

The reference value changing means 43 changes the reference value corresponding to parameters related to the amount of braking operation by the vehicle driver. For example, the amount of braking operation and the braking operation speed are selected as the parameters. In the reference value changing means 43, a reference value during regular brake assist is therefore set as shown by the broken line in FIG. 5, and a reference value during an emergency avoidance steering operation is set as shown by the solid line in FIG. 5. When the emergency avoidance steering operation detection means 42 detects an emergency avoidance steering operation, the reference value changing means 43 changes the reference value for determining a sudden braking operation to the side on which a sudden braking operation is easily detected.

Figure 5:
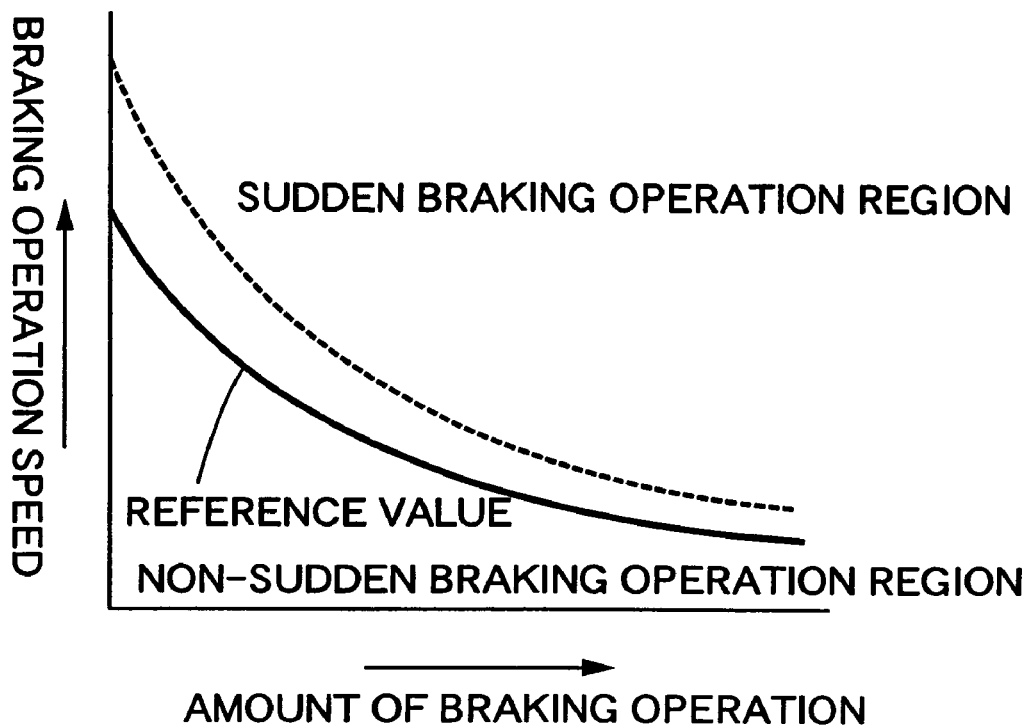

The sudden braking operation detection means 44 detects a sudden braking operation by the vehicle driver based on a value detected by the braking operation amount detection means 31, and judges that there is a sudden braking operation when it is confirmed that the amount of braking operation and the braking operation speed, which are parameters related to the amount of braking operation by the vehicle driver, are in the sudden braking operation region shown in FIG. 5.

Figure 6:
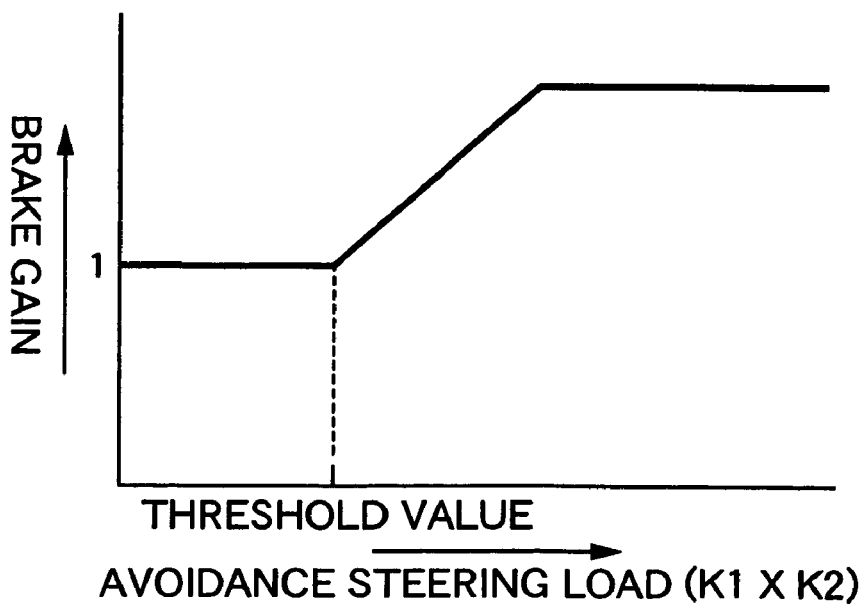

The brake gain is set as shown in FIG. 6 by the brake gain characteristics setting means 45 such that, when the avoidance steering load (K1×K2) exceeds a threshold value, the brake gain increases with the avoidance steering load (K1×K2) up to a predetermined value.

The brake assist pressure determination means 46 determines the brake assist pressure according to the brake gain set by the brake gain characteristics setting means 45. The actuator control means 47 gives to the actuator drive means 48 a signal to control operation of the brake actuator 25, which includes the brake assist means 28, so that the brake assist pressure determined by the brake assist pressure determination means 46 can be obtained, by starting the brake assist when a braking operation is confirmed by a detection signal from the braking operation amount detection means 31 during a determination period in which the emergency avoidance steering operation detection means 42 is detecting an emergency avoidance steering operation or during a determination period from the detection of the emergency avoidance steering operation by the emergency avoidance steering operation detection means 42 to the time when a predetermined period of time has elapsed after the detection has ended.

Figure 7:
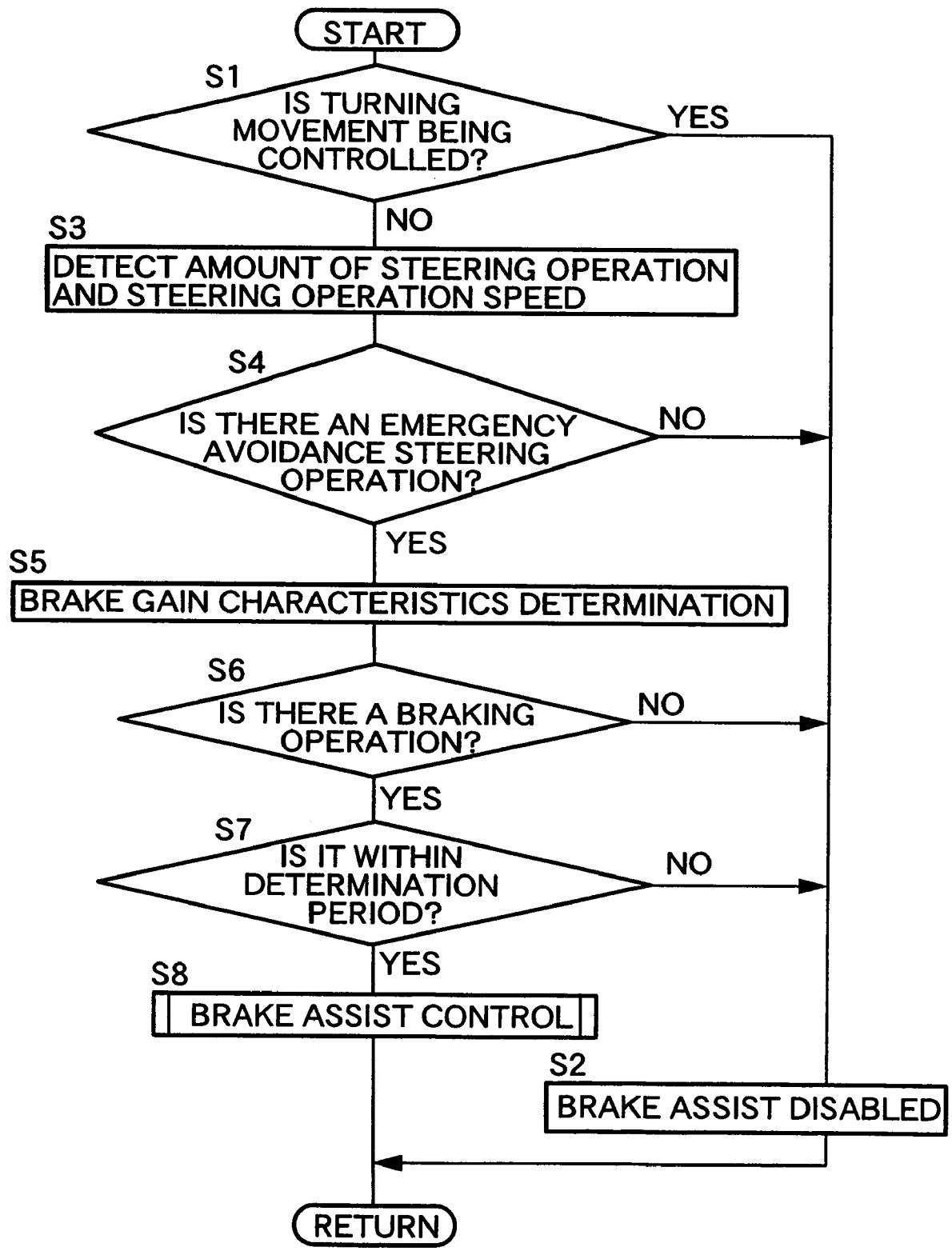

The control procedure of the brake control ECU 29 will be explained by reference to FIG. 7. In Step S1 it is determined whether control by the turning movement control means 41 is being carried out. When the turning movement is being controlled, in Step S2 the brake assist is disabled. When the turning movement is not being controlled, in Step S3 the steering operation amount detection means 37 and the steering operation speed detection means 38 detect the amount of steering operation and the steering operation speed.

In the following Step S4, based on the detected amount of steering operation and the detected steering operation speed, an avoidance steering load (K1×K2) is calculated, and it is determined whether the steering operation is an emergency avoidance steering operation according to whether the avoidance steering load (K1×K2) exceeds the threshold value. When it is determined that the steering operation is an emergency avoidance steering operation, in Step S5 brake gain characteristics corresponding to the avoidance steering load (K1×K2) are determined.

In Step S6 it is determined whether the vehicle driver has carried out a braking operation. In Step S7 it is determined whether the braking operation has been carried out within a determination period. That is, it is determined in Step S7 whether the braking operation has been confirmed during the determination period in which the emergency avoidance steering operation detection means 42 is detecting the emergency avoidance steering operation or during the determination period from the detection of the emergency avoidance steering operation by the emergency avoidance steering operation detection means 42 to the time when a predetermined period of time has elapsed after the detection has ended. When a braking operation is confirmed within the determination periods, the procedure moves to Step S8 and brake assist control is carried out.

Figure 8:
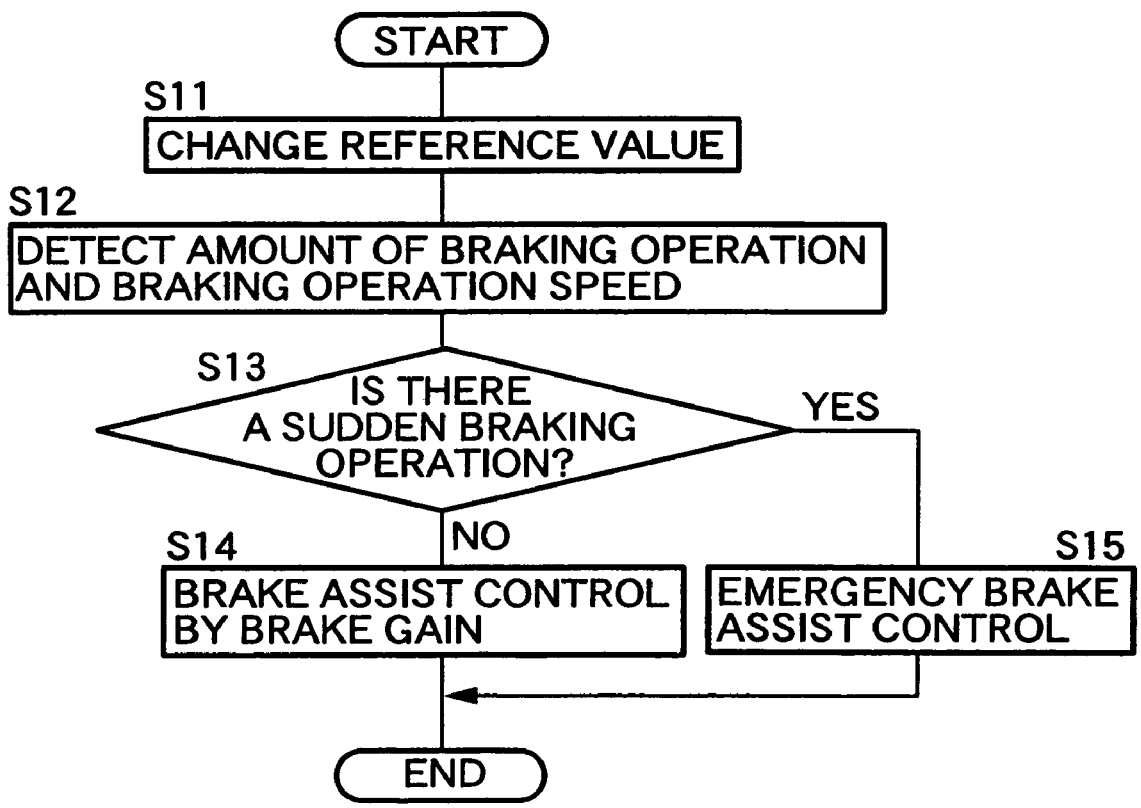

The brake assist control in Step S8 is carried out in accordance with the procedure shown in FIG. 8. In Step S11 of FIG. 8, the reference value, which is used for determining a sudden braking operation, is changed to the side shown by the solid line in FIG. 5. That is, the reference value is changed to the side where it is more easily determined to be a sudden braking operation.

In Step S12 the amount of braking operation and the braking operation speed are detected. In Step S13 it is determined whether the braking operation is a sudden braking operation according to whether it falls within the sudden braking operation region shown in FIG. 5. When it is not a sudden braking operation, in Step S14 brake assist control with the brake gain shown in FIG. 6 is carried out. When it is determined that it is a sudden braking operation, in step S15 emergency brake assist control is carried out by applying full braking.

That is, when an emergency avoidance steering operation by the vehicle driver is detected, the actuator control means 47 controls the operation of the brake actuator 25 so as to carry out brake assist in response to a braking operation being detected while an emergency avoidance steering operation is being detected or during a period from the detection of the emergency avoidance steering operation by the emergency avoidance steering operation detection means 42 to the time when a predetermined period of time has elapsed after the detection has ended. Furthermore, when an emergency avoidance steering operation by the vehicle driver is detected, the reference value, which is used for detecting a sudden braking operation, is changed to the side where it is more easily detected as a sudden braking operation while an emergency avoidance steering operation is being detected or during a period from the detection of the emergency avoidance steering operation by the emergency avoidance steering operation detection means 42 to the time when a predetermined period of time has elapsed after the detection has ended. Therefore, the braking operation that is carried out while an emergency avoidance steering operation is being detected or during a period from the detection of the emergency avoidance steering operation by the emergency avoidance steering operation detection means 42 to the time when a predetermined period of time has elapsed after the detection has ended, can be easily determined to be a sudden braking operation, and emergency brake assist control is carried out in response to the detection of the sudden braking operation. Moreover, when control by the turning movement control means 41 is being carried out before the vehicle driver carries out a braking operation, brake assist by the brake actuator 25 is disabled regardless of the steering operation and the braking operation.

The operation of this first embodiment will be now explained. When the vehicle driver carries out a braking operation to avoid a secondary collision while carrying out an emergency avoidance steering operation, or immediately after carrying out an emergency avoidance steering operation, brake assist by the brake actuator 25 is carried out even if the braking operation is not a sudden braking operation. That is, it is difficult for the vehicle driver to carry out a sudden braking operation as he has to concentrate on the emergency avoidance steering operation, brake assist can be carried out in response to the braking operation, thereby avoiding a collision with a secondary obstacle or moderating the energy of a collision with the secondary obstacle.

When the vehicle driver carries out a braking operation to avoid a secondary collision while carrying our an emergency avoidance steering operation or immediately after carrying out an emergency avoidance steering operation, the braking operation is easily determined to be a sudden braking operation even if it is not a sudden braking operation, so that brake assist by the brake actuator 25 can easily be carried out. Therefore, even when it is difficult for the vehicle driver to carry out a sudden braking operation as he has to concentrate on the emergency avoidance steering operation, brake assist can be carried out in response to the braking operation, thereby avoiding a collision with a secondary obstacle or moderating the energy of a collision with the secondary obstacle.

Conventionally, when control by the turning movement control means 41 is being carried out prior to a braking operation, a steering operation by the vehicle driver is aided by the turning movement control means 41, and in this condition if brake assist by the brake actuator 25 is carried out, the vehicle behavior disadvantageously becomes unstable or the turning movement control and the brake assist control disadvantageously interfere with each other. However, in the present embodiment, since it is arranged that brake assist is not carried out when control by the turning movement control means 41 is being carried out prior to a braking operation, the vehicle behavior can be prevented from becoming unstable and the turning movement control and the brake assist control can be prevented from interfering with each other.

In the above-mentioned first embodiment, the emergency avoidance steering operation detection means 42 detects an emergency avoidance steering operation by the vehicle driver based on the amount of steering operation detected by the steering operation amount detection means 37 and the steering operation speed detected by the steering operation speed detection means 38. However, in the case of a vehicle with power steering, an emergency avoidance steering operation may be detected based on a load level that depends on the rotational speed of a power steering assist motor and a load level that depends on the torque of the assist motor.

Figure 9:
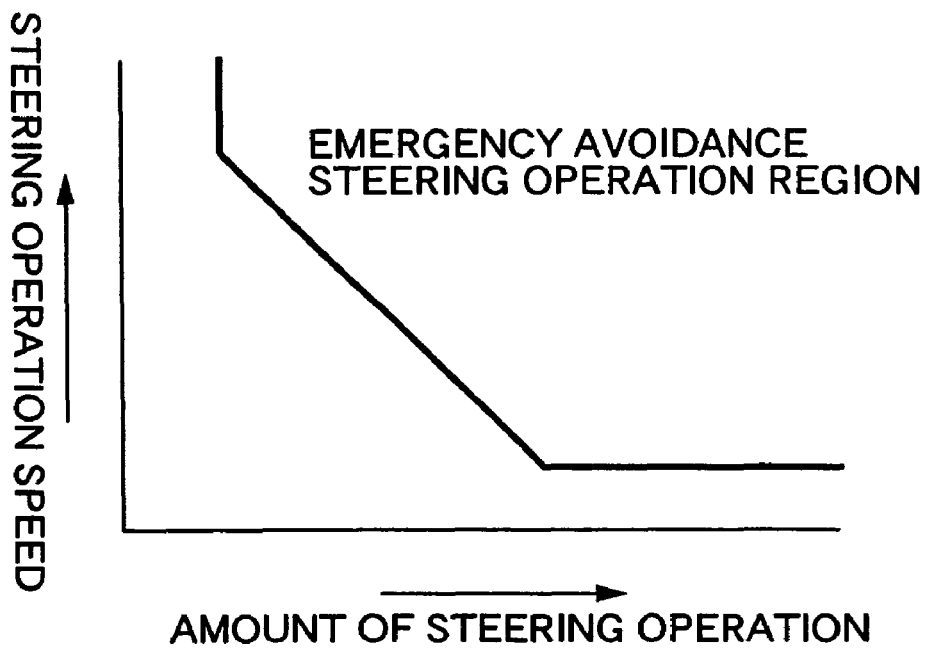
FIG. 9 is a diagram showing an emergency avoidance steering determination map of a second embodiment.
Figure 10:
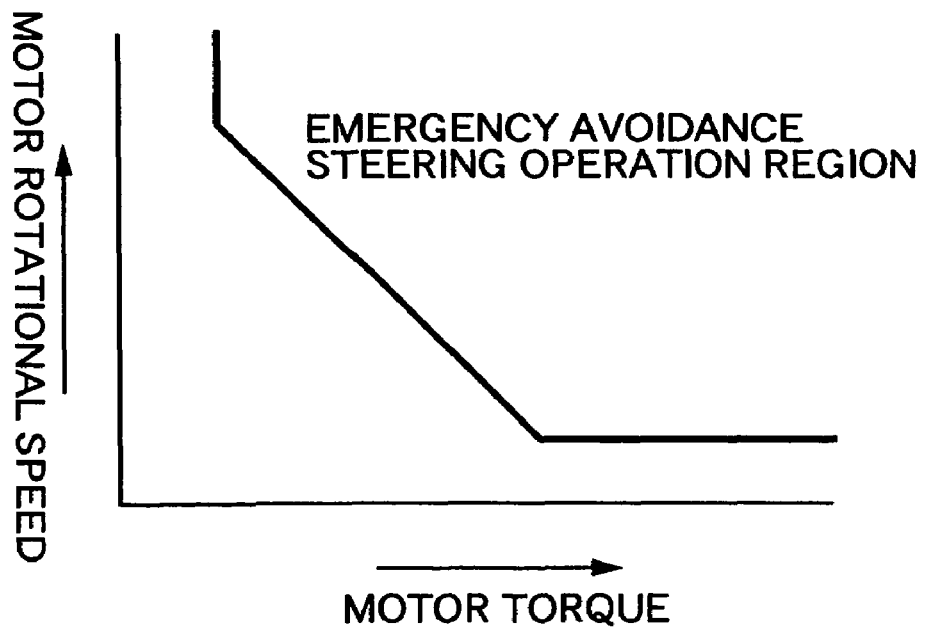
FIG. 10 is a diagram showing an emergency avoidance steering determination map of a third embodiment.
Figure 11:
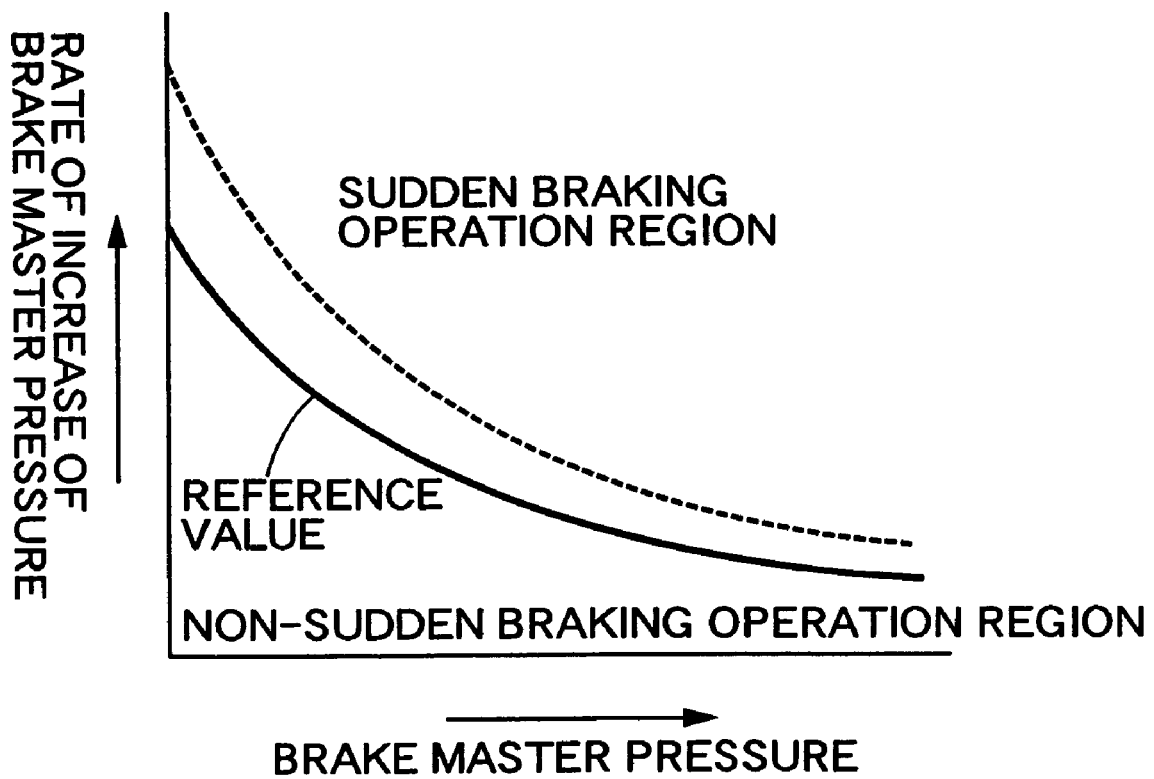
FIG. 11 is a diagram showing reference values for determining sudden braking operation conditions in a fourth embodiment.

It is also possible to determine whether a steering operation is an emergency avoidance steering operation by defining in advance an emergency avoidance steering operation region based on the amount of steering operation and the steering operation speed as in a second embodiment shown in FIG. 9, or defining in advance an emergency avoidance steering operation region based on the torque and the rotational speed of a power steering assist motor as in a third embodiment shown in FIG. 10, and checking whether the steering operation is in the emergency avoidance steering operation region. Furthermore, as in a fourth embodiment shown in FIG. 11, a reference value for determining a sudden braking operation may be determined based on a brake master pressure and a rate of increase of the brake master pressure so that changing the reference value from the broken line to the solid line of FIG. 11 during an emergency avoidance steering operation causes the braking operation to be easily determined to be a sudden braking operation.

Moreover, when control by the turning movement control means 41 is being carried out prior to a braking operation by the vehicle driver, changing of the reference value by the reference value changing means 43 may be disabled, thus reducing the possibility of determining that the braking operation is a sudden braking operation, so that brake assist during turning movement control can be avoided as much as possible, thereby preventing the vehicle behavior from becoming unstable and the turning movement control and the brake assist control from interfering with each other.

Although embodiments of the present invention are explained in detail above, the present invention is not limited to these embodiments, and the present invention can be modified in a variety of ways without departing from the subject matter of the present invention.

What is claimed is:

1. A vehicular brake system comprising a brake actuator that enables brake assist to be carried out, the brake assist increasing a braking force exhibited by wheel brakes in response to a braking operation input by a vehicle driver in comparison with the braking force when it is unassisted, wherein the vehicular brake system further comprises:

braking operation detection cans for detecting a braking operation by the vehicle driver;

emergency avoidance steering operation detection means for detecting an emergency avoidance steering operation by the vehicle driver;

actuator control means for controlling operation of the brake actuator so as to carry out the brake assist in response to the braking operation detection means detecting a braking operation while the emergency avoidance steering operation is being detected by the emergency avoidance steering operation detection means or during a period from the detection of an emergency avoidance steering operation by the emergency avoidance steering operation detection means to the time when a predetermined period of time has elapsed after the detection has ended;

turning movement target value determination means for determining a target value for vehicle turning movement; turning movement actual value detection means for detecting an actual value of vehicle turning movement; and turning movement control means for comparing the actual value with the target value and controlling the braking forces of the wheel brakes based on the result of the comparison so that the actual value approaches the target value; and brake assist disabling means for disabling brake assist by the brake actuator when control by the turning movement control means is being carried out before the vehicle driver carries out a braking operation.

2. A vehicular brake system comprising sudden braking operation detection means for detecting a sudden braking operation by a vehicle driver based on comparison between a sensed parameter of braking operation amount and a first reference value of braking operation amount; and a brake actuator that enables brake assist to be carried out when there is a sudden braking operation, the brake assist increasing a braking force exhibited by wheel brakes in response to a braking operation input by the vehicle driver in comparison with the braking force when no sudden braking operation is detected, wherein the vehicular brake system further comprises:

emergency avoidance steering operation detection means for detecting an emergency avoidance steering operation by the vehicle driver;

reference value changing means for changing the first reference value to a second reference value when the emergency avoidance steering operation is detected by the emergency avoidance steering operation detection means or during a predetermined period of time after the detection has ended, wherein the second reference value is set to make a sudden braking operation detected more easily as compared with the first reference value;

turning movement target value determination means for determining a target value for vehicle turning movement; turning movement actual value detection means for detecting an actual value of vehicle turning movement; and turning movement control means for comparing the actual value with the target value and controlling the braking forces of the wheel brakes based on the result of the comparison so that the actual value approaches the target value; and means for disabling the changing operation by the reference value changing means when control by the turning movement control means is being carried out before the vehicle driver carries out a braking operation.

* * * * *